United States Patent
Phillips et al.

(10) Patent No.: US 6,220,399 B1
(45) Date of Patent: Apr. 24, 2001

(54) CABLE OPERATED PISTON BRAKE FOR BICYCLES

(76) Inventors: Cal M. Phillips, 4435 Jewell La., Platteville, WI (US) 53818; John V. Stewart, 1308 Henry Balch Dr., Orlando, FL (US) 32810

( * ) Notice: Subject to any disclaimer, the term of this patent is extended or adjusted under 35 U.S.C. 154(b) by 0 days.

(21) Appl. No.: 09/139,801

(22) Filed: Aug. 25, 1998

Related U.S. Application Data

(60) Provisional application No. 60/057,174, filed on Aug. 26, 1997.

(51) Int. Cl.[7] .................................................... B62L 3/00
(52) U.S. Cl. ..................... 188/24.21; 188/24.22
(58) Field of Search .............................. 188/24.11, 24.14, 188/24.21, 24.22, 344

(56) References Cited

U.S. PATENT DOCUMENTS

| | | | |
|---|---|---|---|
| 3,776,333 | * 12/1973 | Mathauser | 188/344 |
| 5,293,964 | 3/1994 | Li . | |
| 5,320,199 | 6/1994 | Min . | |

FOREIGN PATENT DOCUMENTS

| | | | |
|---|---|---|---|
| 6716 | 2/1907 | (FR) . | |
| 943589 | 3/1949 | (FR) . | |
| 0455428 | * 3/1949 | (FR) | 188/24.21 |
| 0984467 | * 7/1951 | (FR) | 188/24.21 |
| 56689 | 10/1952 | (FR) . | |

* cited by examiner

Primary Examiner—Christopher P. Schwartz
(74) Attorney, Agent, or Firm—John V. Stewart

(57) ABSTRACT

A piston (1) slidably mounted in a case (14), with an actuator cable (22) routed around a first cable guide (15) on the brake case, thence beside the piston to a second cable guide (6) on the end of the piston, which redirects it 180 degrees to return beside the piston to a cable end holder (12) on the case. The actuator cable runs parallel to the piston on both sides, transferring twice its tension to the piston. A cam (60) is provided for full control of the brake gain relative to the tension of the main cable from the hand lever. This adapts the brake to a given hand lever, and provides both fast braking response and high power via a variable gain curve on each stroke. Floating pads are provided for automatic toe. All brake position adjustments relative to the rim are easy and are independent of each other. Quick means are provided for changing the tire and pads, and these operations do not reset the brake position adjustments.

14 Claims, 21 Drawing Sheets

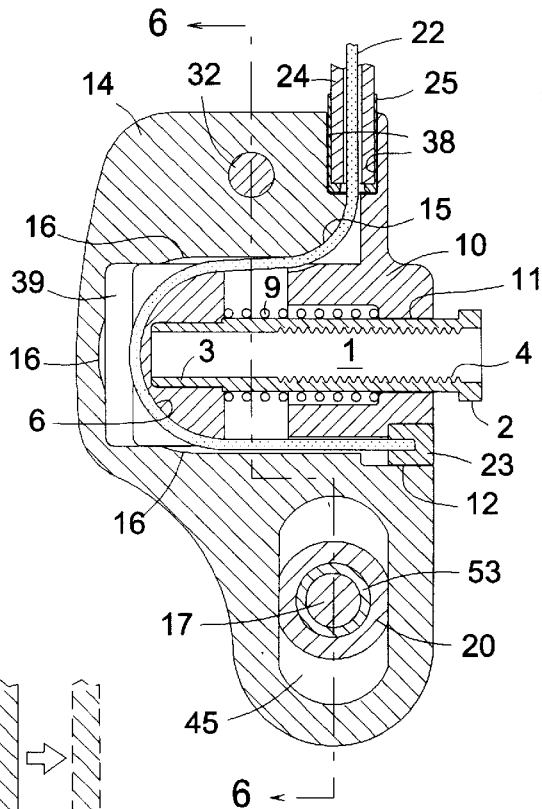
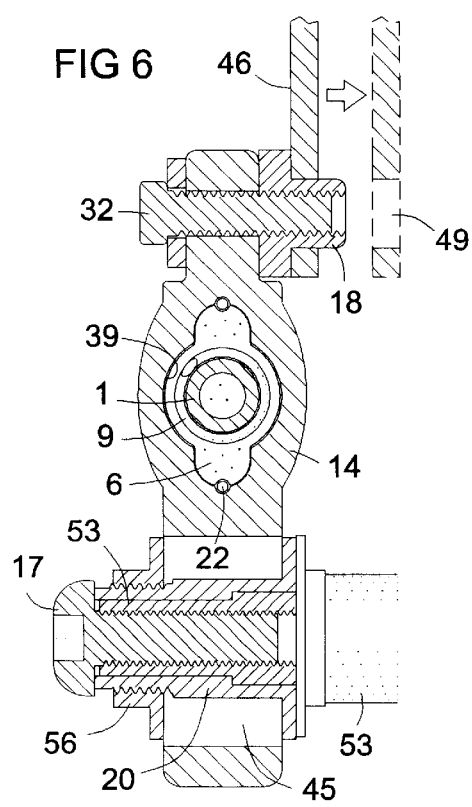
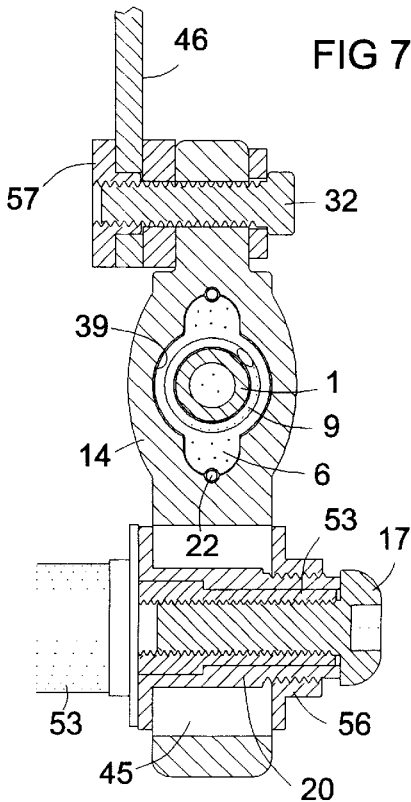

CABLE OPERATED PISTON BRAKE FOR BICYCLES

CROSS-REFERENCE TO RELATED APPLICATIONS

This application claims the benefit of U.S. Provisional Application No. 60/057,174, filed Aug. 26, 1997.

BACKGROUND OF THE INVENTION

1. Field of the Invention

This invention is in the field of bicycle brakes, especially rim brakes, including caliper, cantilever, and hydraulic types.

2. Description of Prior Art

Bicycle brakes are of three main types—rim, disc, and drum. Disc brakes have a metal disc attached to the wheel hub, which is clamped between two pads, and thus slowed by the brake. Disc brakes are expensive and heavy. Drum brakes, including coaster brakes, are dissimilar to the present invention.

Rim brakes clamp the wheel rim between two pads. They are lighter than disc brakes, because: 1) they do not require a disc; 2) they have greater braking moment on the wheel, so less pad force is required, allowing lighter parts; and 3) their higher mounting site results in shorter control lines. Since wheel rims are less true than discs, rim brake pads need more clearance to the rim, and therefore longer pad movement than disc brakes, so they need longer actuator parts. Rim brakes also need means to retract the pads enough to admit the tire between them for wheel removal.

Caliper rim brakes, as in U.S. Pat. No. 4,838,387 (Yoshigai), comprise two arms pivoting on a bolt in the velocipede frame centered just above a tire. The arms reach around the tire to hold brake pads at each side of the rim, and clamp them against the rim. These brakes cannot provide maximum firmness, due to flex in the arms. This is especially so with wide tires, which require longer arms. The pads wear unevenly, due to the flex and arc of the arms.

Cantilever rim brakes, as in U.S. Pat. No. 4,768,623 (Nagano), comprise two levers, each bolted to a pivot mount on the fork on each side of the rim. The main brake cable is connected by a bridge to a straddle cable, which effectively branches the main cable into two ends, each connected to the upper end of one of the levers. The pad moves in an arc, causing uneven, accelerated wear. These brakes are highly inconvenient to adjust, and must be readjusted for toe, alignment, and vertical position as the pads wear and after each pad replacement. A limit on the firmness of these brakes is flex in the fork. The cantilever mount is positioned below the level of the rim. The fork bows outward noticeably under braking stress at this point.

Hydraulic piston brakes are powerful, firm, and linear, but are also heavy, expensive, and require maintenance of hydraulic fluid. The present invention is a cable-operated piston brake with the advantages of hydraulic piston brakes, and without the above disadvantages. It provides features for increased power, convenience of installation, adjustment, and wheel removal.

French patents 56,689 (Durif) and 943,589 (Fonteneau) show cable-operated piston rim brakes. They do not route the cable parallel to the piston on both sides it for maximum power and symmetric cable force on the piston. The actuator cable pulls the end of the piston sideways, creating friction. They do not provide enclosed cases. 943,589 provides a case, but It requires a slot in the top for the cable entrance, which allows contaminants to enter the case.

SUMMARY

The objects of the invention are the following features in a lightweight bicycle brake: pads that move in a straight line; full gain control for fast braking response and high power; insignificant fork flex; easy installation and adjustment; constant vertical adjustment throughout pad life; automatic toe; and quick tire and pad changes which do not affect any brake adjustments (except pad/rim clearance if the new pad is a different thickness).

The cable-operated piston brake for bicycle rims herein accomplishes these objects, comprising a piston slidably mounted in a case. An actuator cable is routed around a first cable guide on the brake case, thence beside the piston to a second cable guide on the end of the piston, which redirects it 180 degrees to return beside the piston to a cable end holder on the case. The actuator cable runs parallel to the piston on both sides, transferring twice its tension to the piston. A cam is provided for full control of the brake gain relative to the tension of the main cable from the hand lever. This adapts the brake to a given hand lever, and provides both fast braking response and high power via a variable gain curve on each stroke. Floating pads are provided for automatic toe. All brake position adjustments relative to the rim are easy and are independent of each other. Quick means are provided for changing the tire and pads, and these do not reset the brake position adjustments.

BRIEF DESCRIPTION OF THE DRAWINGS

FIG. 5 is a front sectional view of the right brake actuator of FIG. 1.

FIG. 6 is a sectional view of the right brake actuator along line 6—6 of FIG. 4.

FIG. 7 is a sectional view of the left brake actuator on a respective section line as in FIG. 6.

REFERENCE NUMERALS

Figure 1:
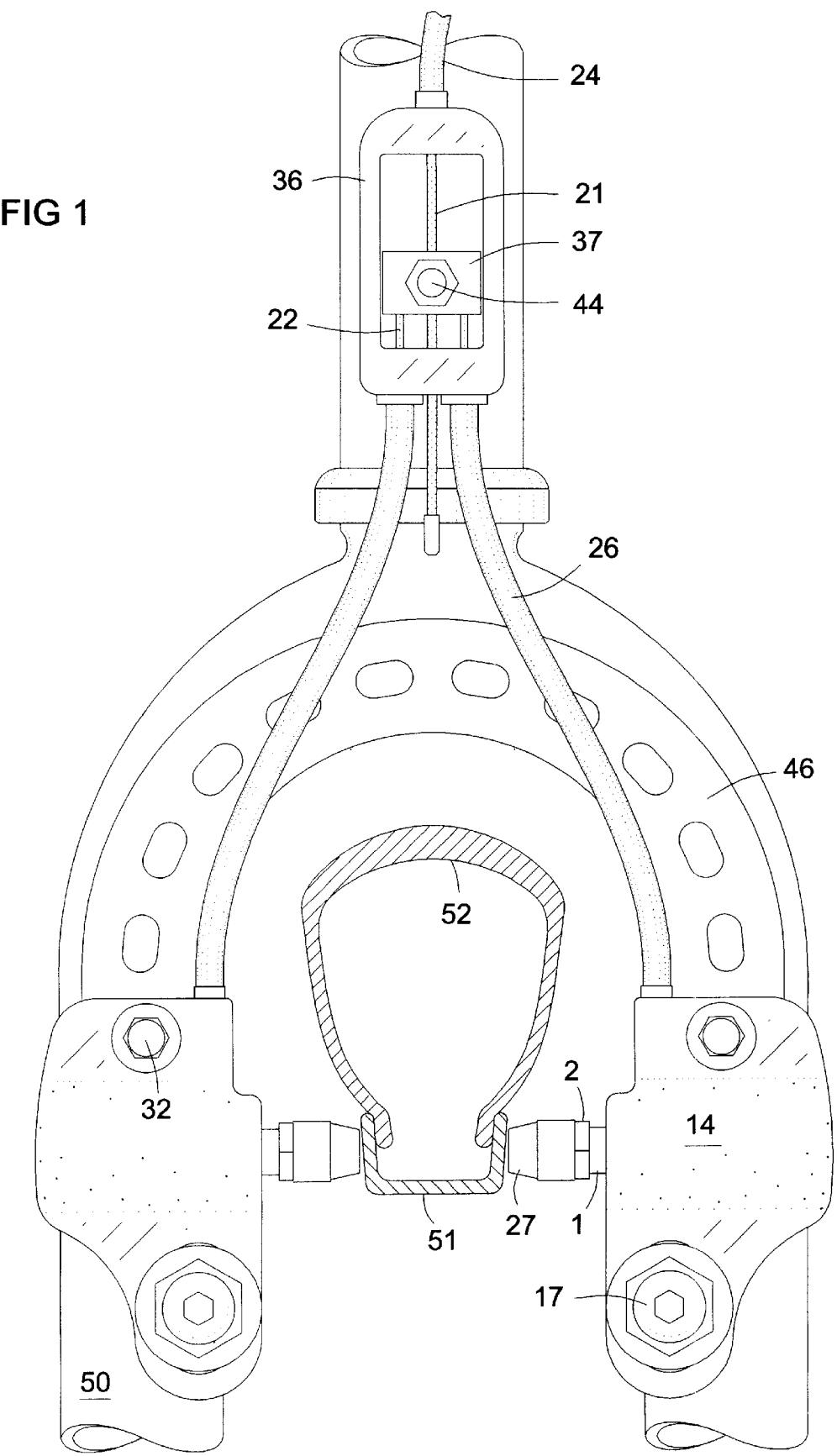
FIG. 1 is a front view of a cantilever-mount version of the brake mounted on a fork.

1. Piston
2. Inner end of piston
3. Outer end of piston
4. Internal threads
5. Surface of piston
6. Outer cable guide
7. Piston holder of outer cable guide
8. Cable groove of outer cable guide
9. Spring
10. Plug
11. Cylinder bore in plug
12. Cable end holder or chamber
13. Spring chamber
14. Cantilever case
15. Inner cable guide
16. Cable channel
17. Cantilever post bolt
18. Coupling pin
19. Caliper case
20. Cantilever post adapter shaft
21. Main cable
22. Actuator cable
23. Cable end barrel
24. Cable sheath
25. Cable sheath ferrule
26. Actuator cable sheath
27. Pad
28. Pad stem
29. Case release knob
30. Threaded nut portion of knob
31. Stop cap
32. Mounting bolt for case to crossover brace
33. Right caliper case vertical adjustment nut
34. Left caliper case vertical adjustment nut
35. Washer
36. Cable divider frame
37. Cable divider coupler
38. Cable sheath ferrule chamber in case and plug
39. Outer cable guide chamber in case
40. Caliper mounting bolt
41. Caliper mount crossover brace
42. Case mount/vertical adjustment slot
43. Wide cable bridge
44. Main cable attachment/adjustment bolt
45. Cantilever mount/vertical adjustment slot in case
46. Cantilever mount crossover brace
47. Spacer
48. Horizontal adjustment slot
49. Slip hole in cantilever crossover brace
50. Fork
51. Rim
52. Tire
53. Cantilever post
54. Caliper mount bolt hole in caliper crossover brace
55. Track in case for caliper crossover brace
56. Cantilever vertical adjustment nut
57. Nut for mounting left cantilever case to crossover brace
60. Variable gain cam
61. Front crossover brace
62. Back crossover brace
63. Main cable guide tube
64. Floating pad
65. Crossover quick-release pin
66. Cantilever post bolt
67. Pad balance adjustment nut
68. Axle for guide wheel on crossover brace
69. Pad balance adjustment nut
70. Dual pulley wheel attached to cam
71. Main cable end
72. Cable hanger post
73. Cable lock
74. Guide wheel on crossover brace
75. Hook in crossover brace for cable hanger post
76. Brake pad pivot pin
77. Brake pad retainer pin
78. Brake pad holder
79. Direction of rim rotation
80. Pad longitudinal stop on pad holder
82. Common axle for variable gain cam and dual pulley wheel

TERMINOLOGY

Actuator: A brake assembly for one side of a rim including a case and its internal parts.
Inner: Laterally closer to center.
Outer: Laterally farther from center.
Right, Left, Lateral: Relative to the rider on a bicycle

DESCRIPTION OF THE PREFERRED EMBODIMENTS

The invention is a cable-operated piston brake for bicycles that is adaptable to cantilever or caliper mounts. The cantilever version is shown in FIGS. 1–12, and the caliper version is shown in FIGS. 13–24. The brake cases for these two embodiments differ externally but are identical internally. The cantilever case (14) has a vertically elongated slot (45) for mounting the case at adjustable height on conventional cantilever posts (53). It also has mounting bolts (32) which couple the case to a crossover brace (46)

that provides lateral rigidity, allowing high piston force without flexing the fork.

FIG. 1 shows the brake actuators mounted on cantilever posts on a bicycle fork (50), with mounting bolts (17). A main brake cable (21) is tensioned by a hand lever (not shown) on the handle bars of the bicycle. Individual actuator cables (22) branch from the main cable (21) by means of a cable divider comprising a coupler (37) housed in a frame (36). The coupler is connected to the main cable by a cable clamp bolt (44) which can be loosened to adjust the pad-to-rim clearance. A standard type of cable bridge can optionally be used, as in FIGS. 10–12. However, the cable divider has the advantage that all cable tensions are opposed by sheaths. This eliminates upward pull on the brake actuators by the actuator cables, thus eliminates the need for a cable hanger to retain the end of the main cable. It also allows the actuators to pivot for wheel removal, as later described, without detaching the actuator cables from the bridge.

Figure 2:
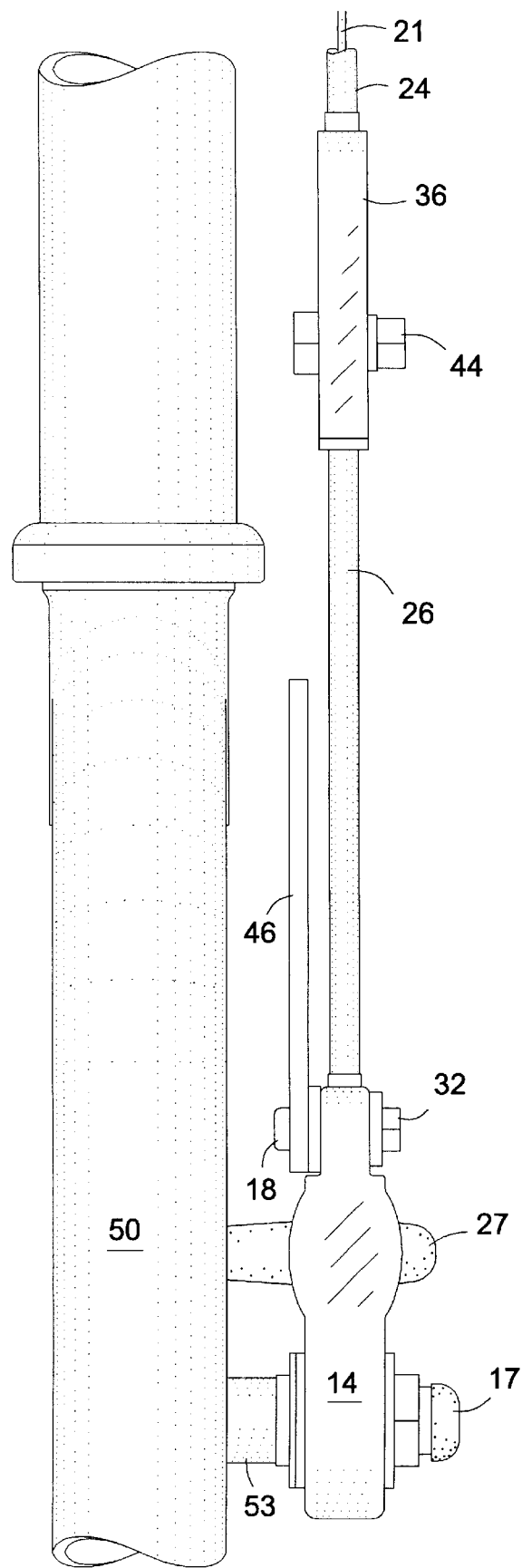
FIG. 2 is a right side view of FIG. 1.
Figure 3:
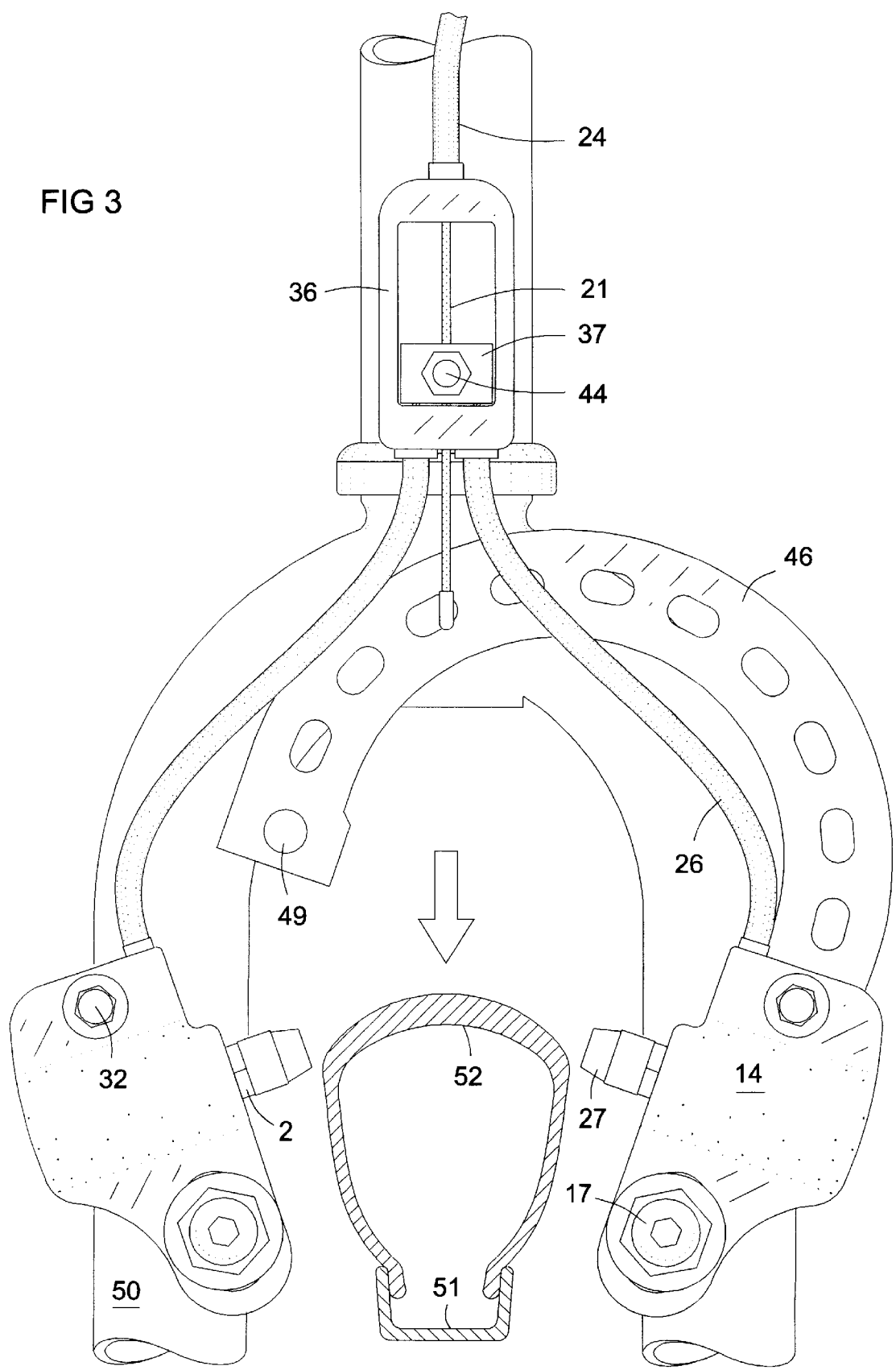
FIG. 3 is a front view of FIG. 1 with the actuators separated for wheel removal.
Figure 4:
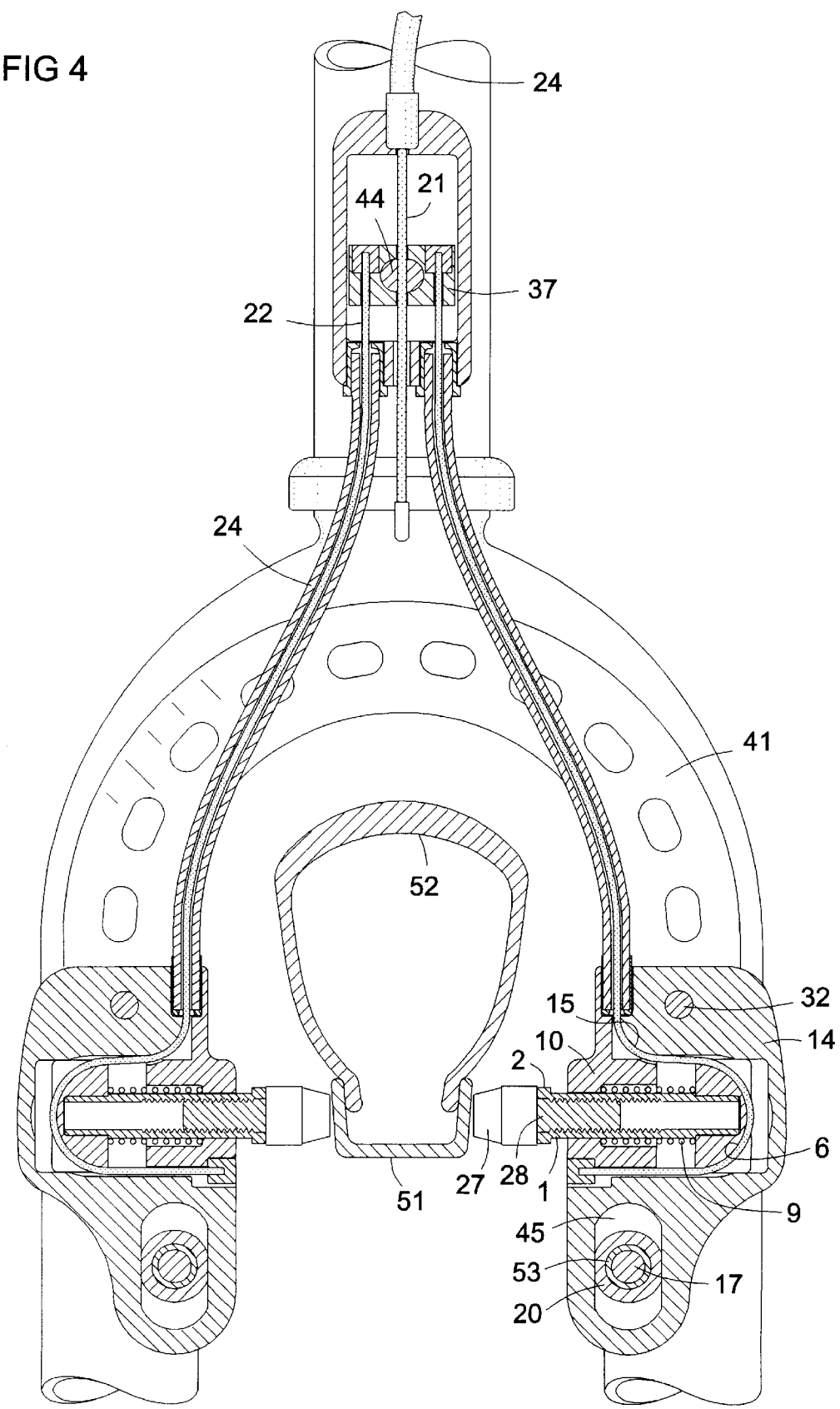
FIG. 4 is a front sectional view of FIG. 1.
Figure 8:
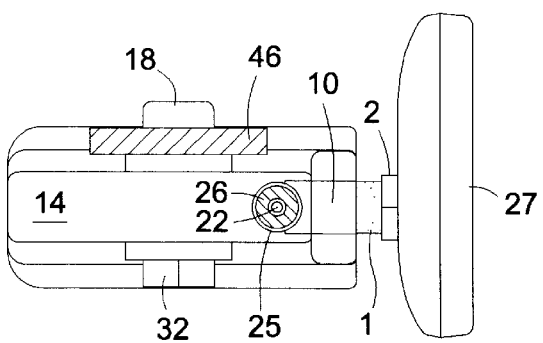
FIG. 8 is a top view of the right brake actuator along line 8—8 of FIG. 4.
Figure 9:
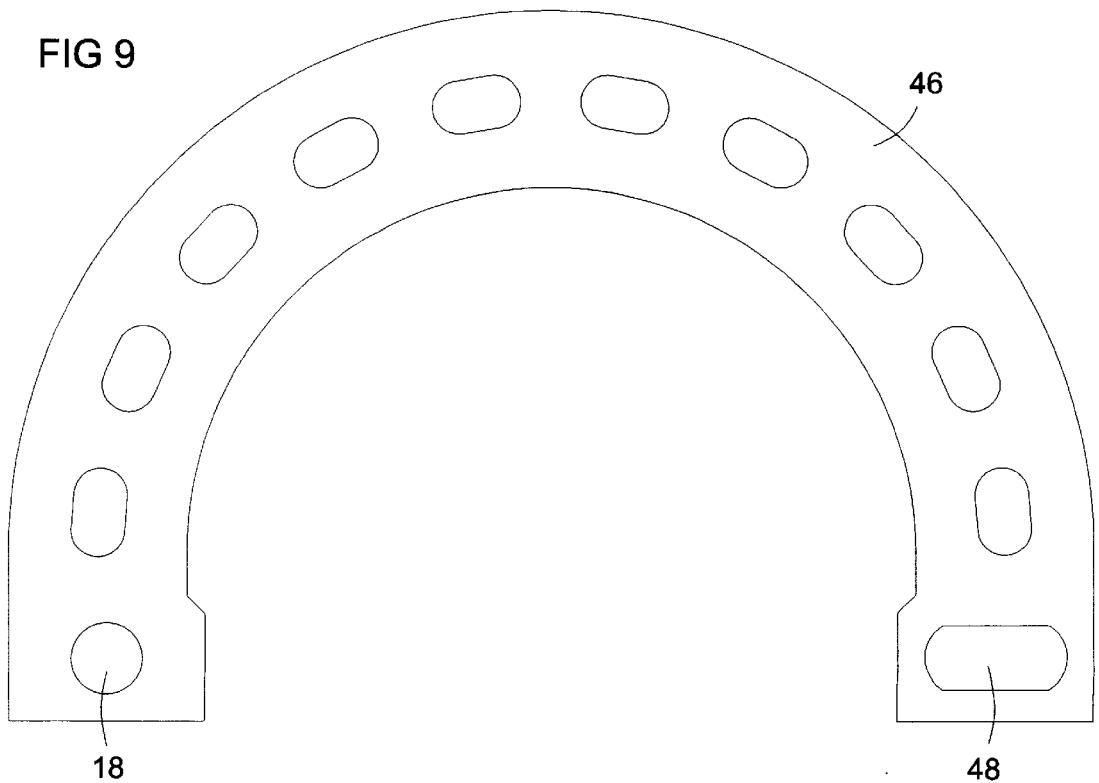
FIG. 9 is a front view of the cantilever mount crossover brace.
Figure 10:
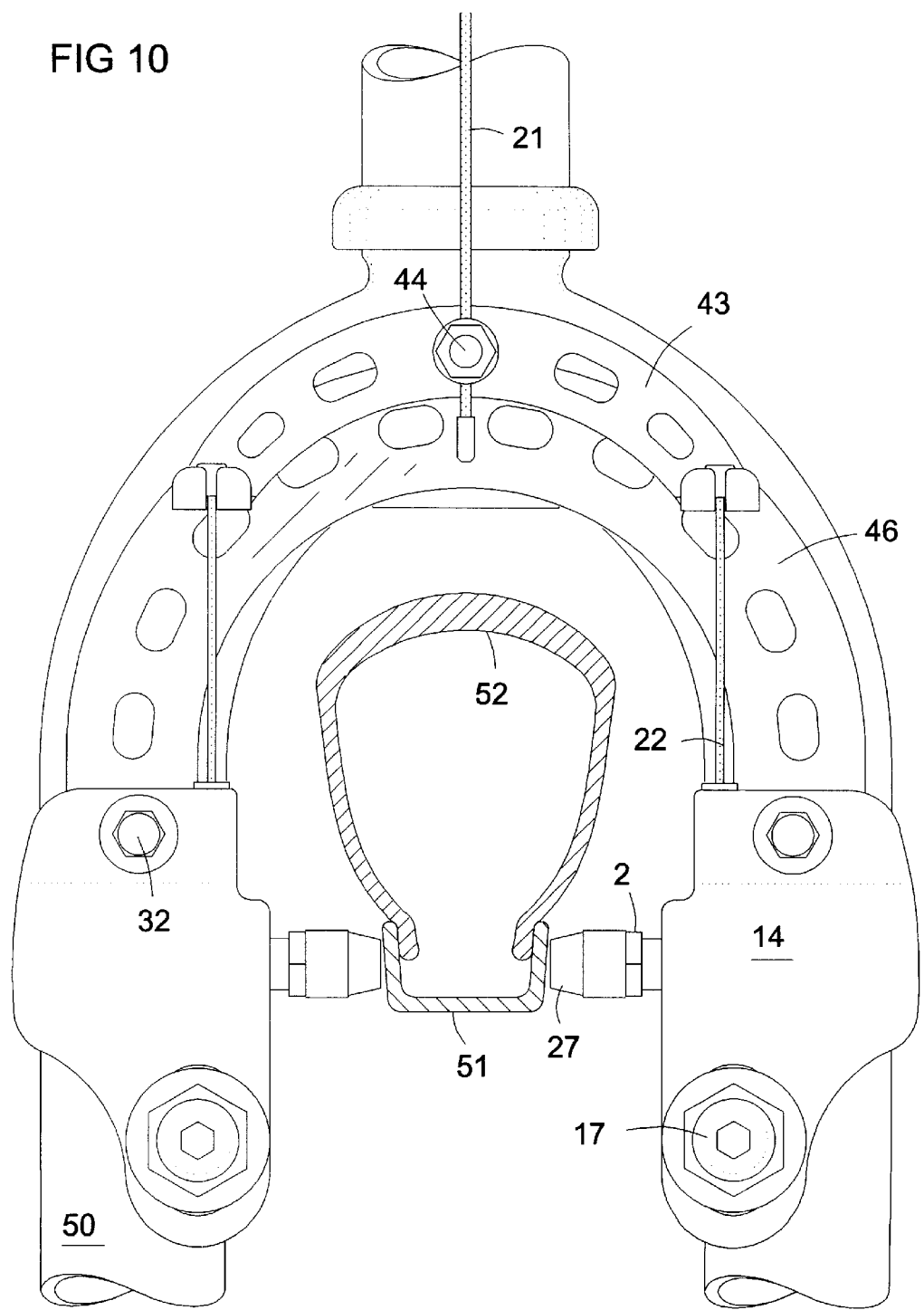
FIG. 10 is the brake of FIG. 1 shown with a wide standard cable bridge.
Figure 11:
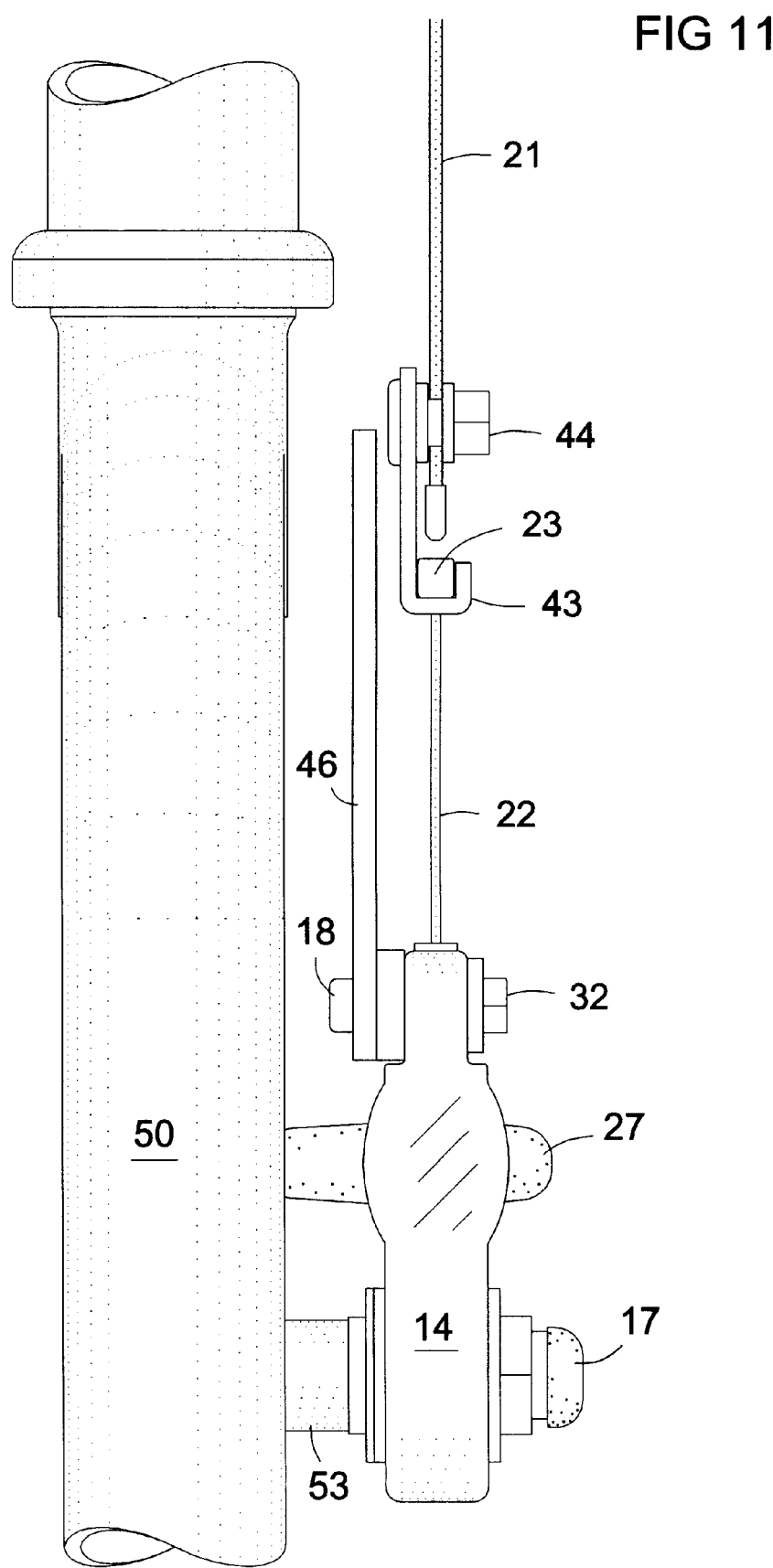
FIG. 11 is a side view of FIG. 10.
Figure 12:
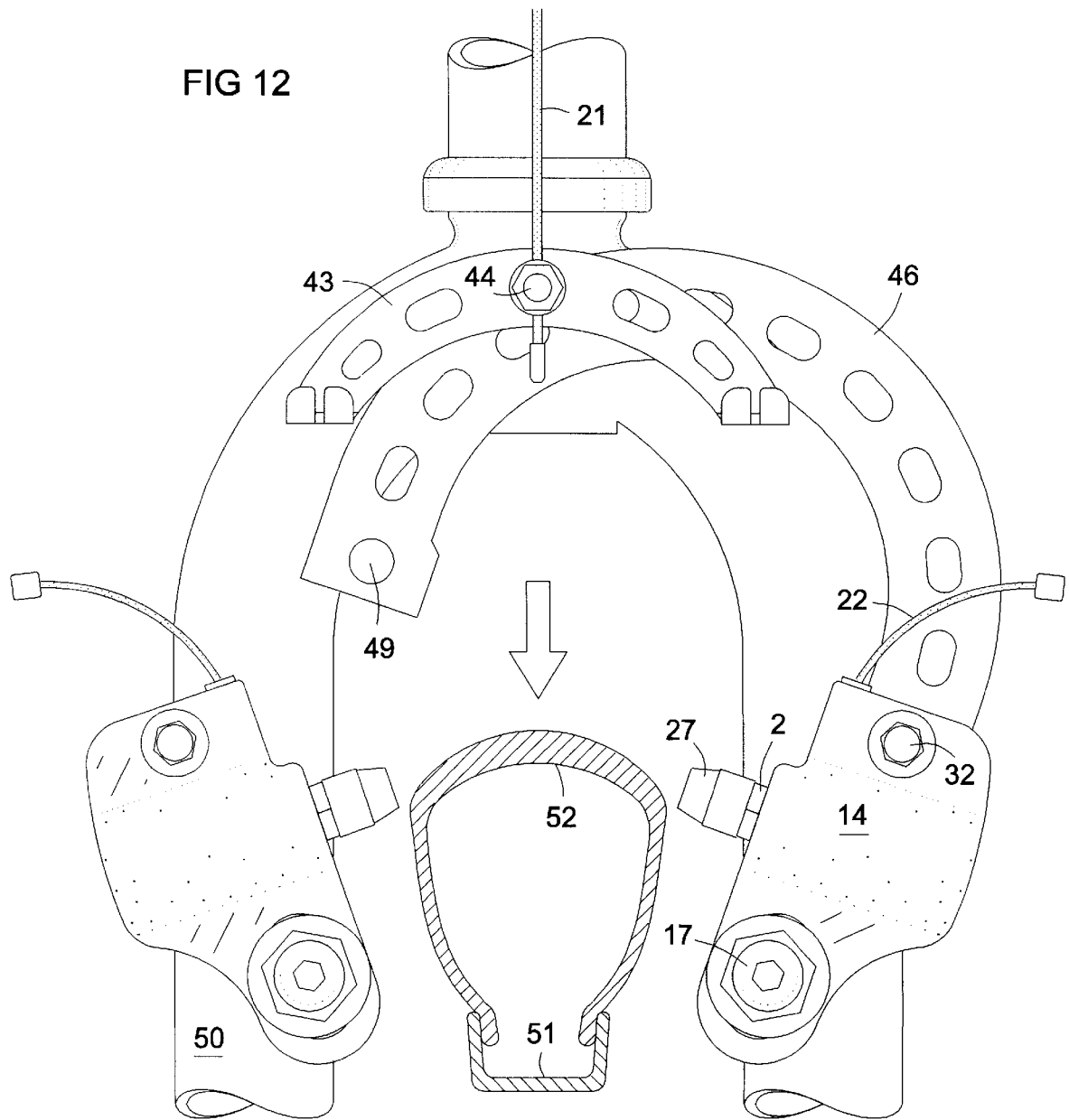
FIG. 12 is the brake of FIG. 10 showing the actuators separated for wheel removal.
Figure 13:
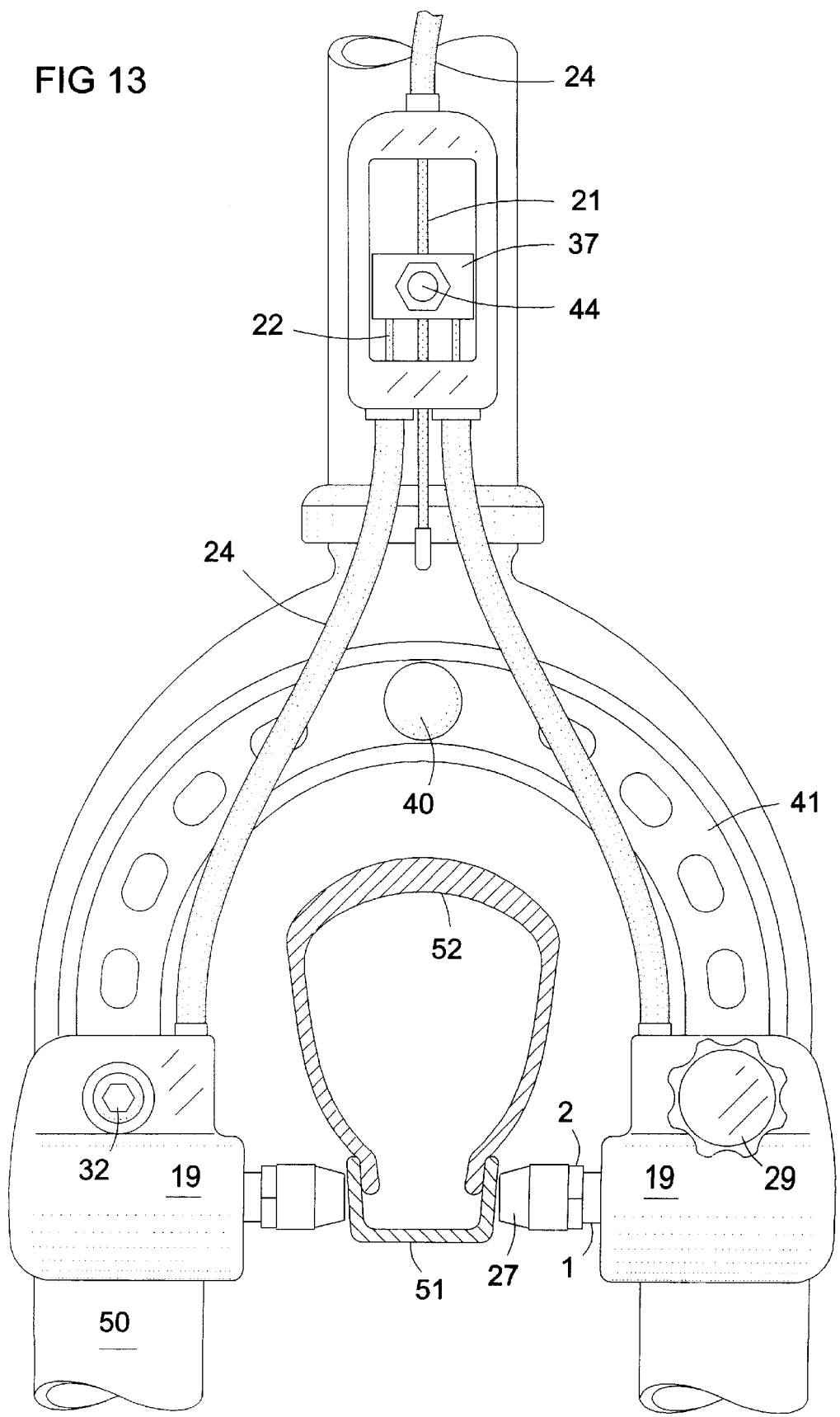
FIG. 13 is a front view of a caliper-mount version of the brake mounted on a fork.
Figure 14:
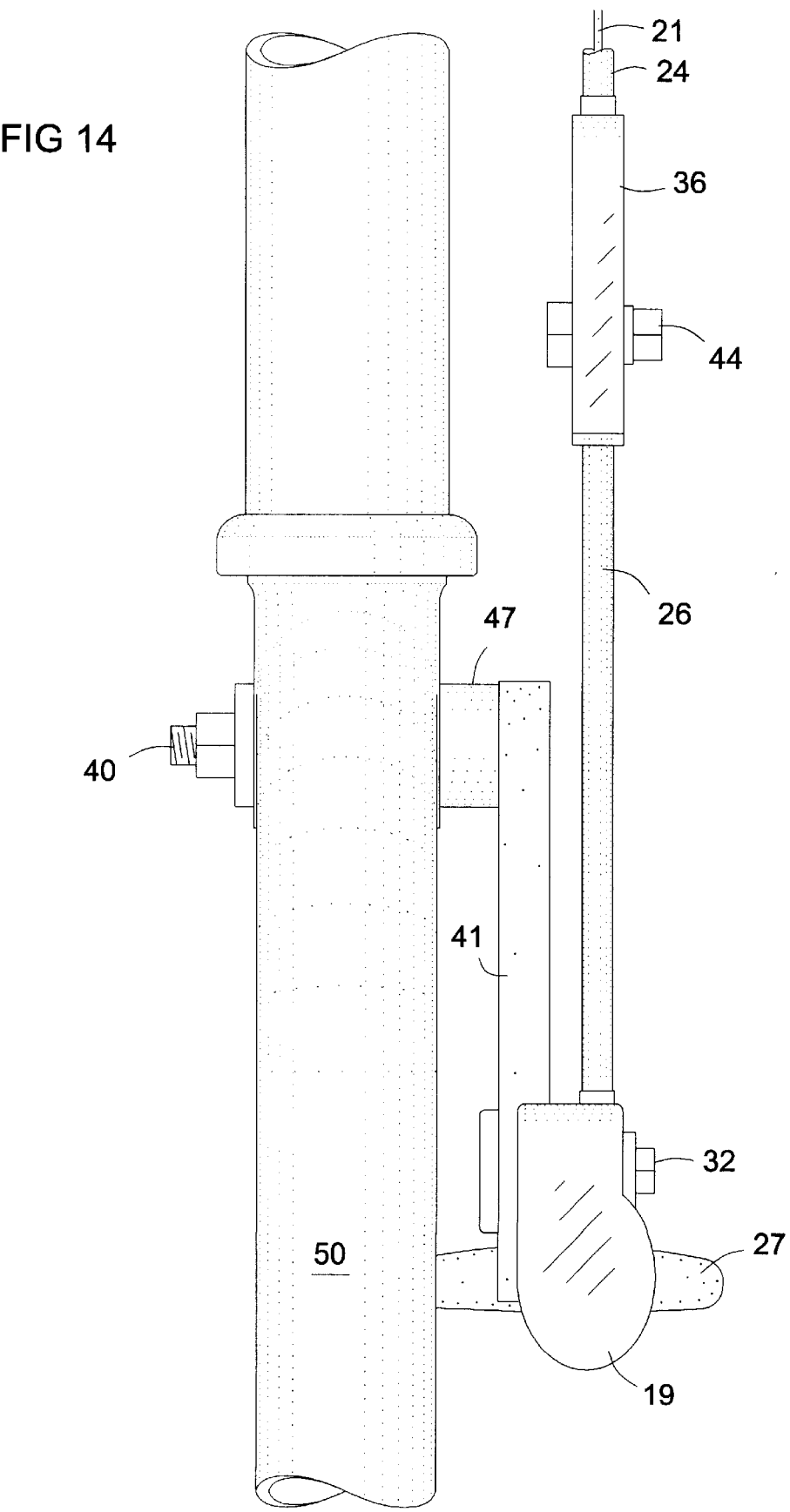
FIG. 14 is a right side view of FIG. 13.
Figure 15:
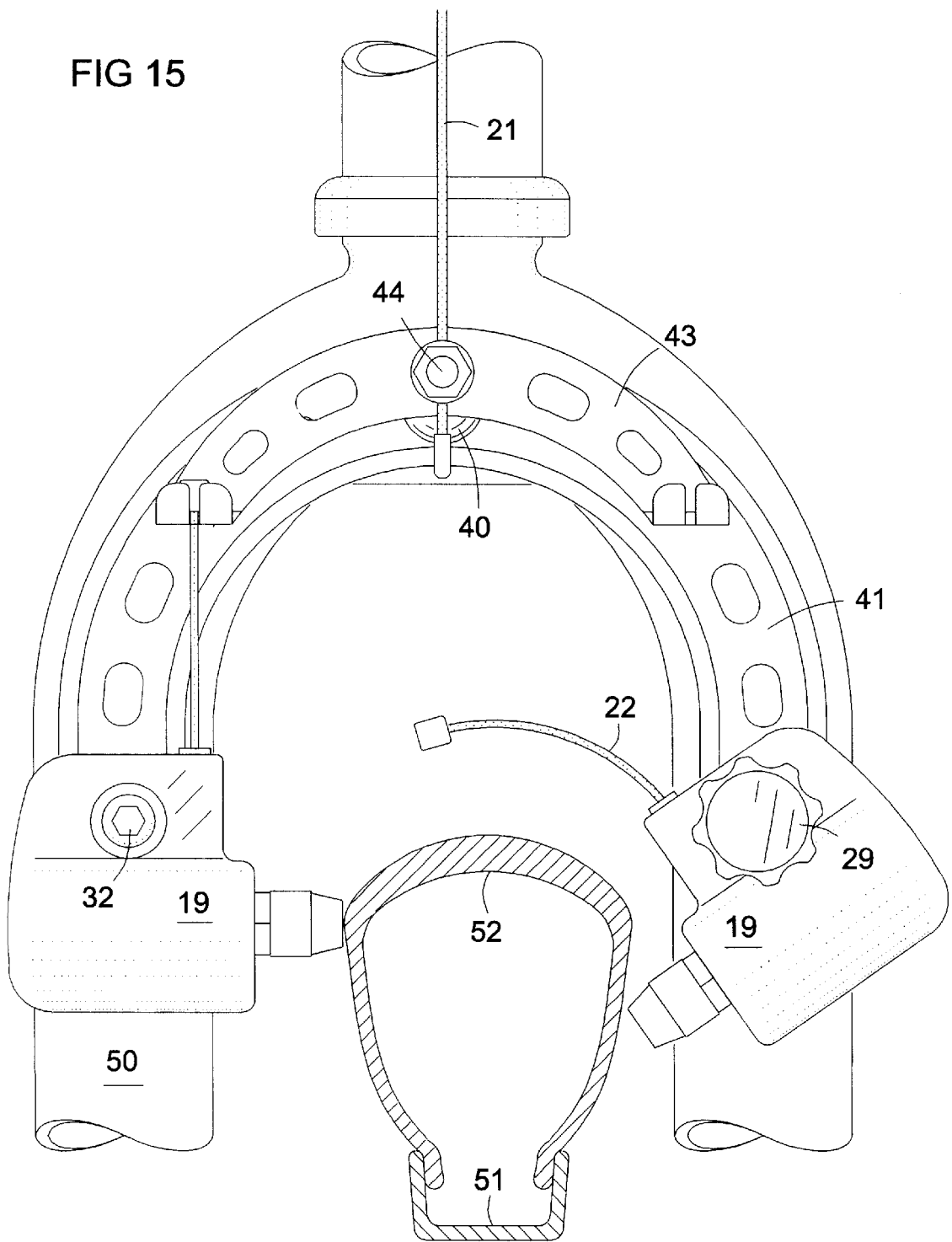
FIG. 15 is a front view of FIG. 13 shown with a wide standard cable bridge, with the left actuator pivoted for wheel removal.
Figure 16:
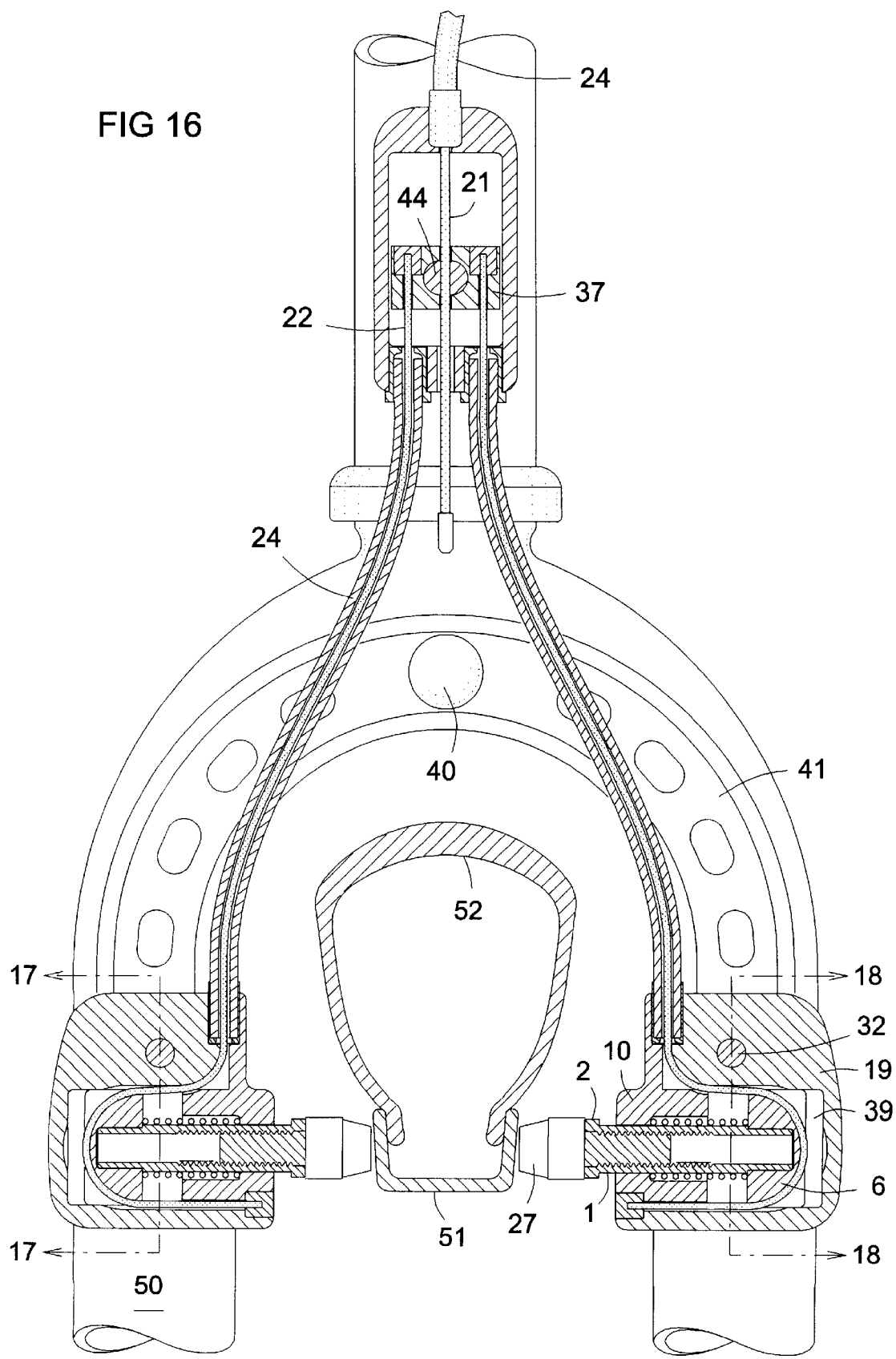
FIG. 16 is a front sectional view of FIG. 13.
Figure 17:
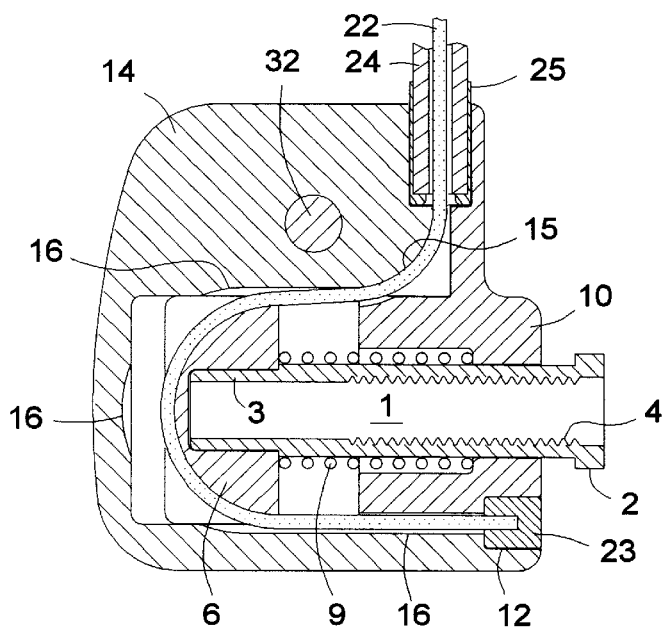
FIG. 17 is a front sectional view of the right brake actuator of FIG. 16.
Figure 18:
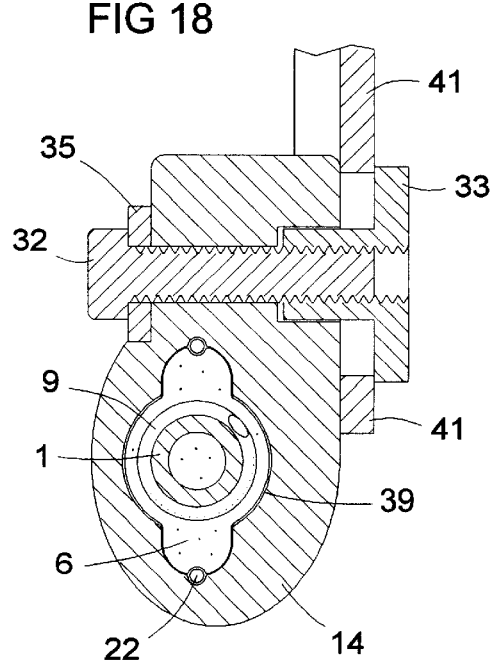
FIG. 18 is a sectional view of the right brake actuator along line 18—18 of FIG. 16.

FIGS. 2 and 6 show how the right brake actuator is coupled to the crossover brace (46) by a coupling pin (18) which is serves as a nut on the case mounting bolt (32). The coupling pin slips into a hole (49) in the right end of the crossover brace (46). As shown in FIG. 3, for wheel removal the crossover brace is manually flexed away from the case, slipping the pin out of the hole. This releases the right brake actuator from the brace, allowing the two actuators to pivot laterally away from each other. To reconnect the actuators, they are pivoted inward until the slip hole of the crossover brace aligns and engages with the coupling pin. This is a quick manual procedure, done without tools.

As shown in FIGS 5–7, an adapter shaft (20) is journalled on each cantilever post to maintain the vertical adjustment of the cases while allowing the cases to pivot on the posts. The adapter shaft has flat sides (FIG. 5) which prevent it from twisting in the vertical slot (45) in the case. With the case at the desired height, a nut (56) fixes the adapter shaft to the case. The head of the cantilever mounting bolt (17) is tightened against the adapter shaft enough to eliminate longitudinal play, but loose enough to allow pivoting of the adapter shaft on the cantilever post. Thus, the brake cases can pivot for wheel removal without losing their vertical adjustment. The caliper bolt (17) can be set with thread locking compound to avoid its loosening by the pivoting adapter shaft.

FIGS. 4–7 show the internal structure of the brake. The actuator cable (22) enters the top of the brake case (14), and is redirected by an inner cable guide (15) about 90 degrees to a path parallel to the piston (1). The inner cable guide (15) is preferably a toric groove in the case material, which is preferably plastic. It can also be embodied as a pulley wheel. The cable is routed to the outer end of the piston, and is guided around it 180 degrees by an outer cable guide (6) on the outer end of the piston. The cable then parallels the piston to the inner end of the case, where it terminates in a cable barrel chamber (12). This cable routing applies twice the tension of the actuator cable to the piston. For example, when the actuator cable carries 50 N of tensile force (11 lbs), the piston will be extended with 100 N of force (22 lbs).

The brake actuator is easy to assemble as follows:
1. Insert the piston (1) into the bore (11) of the plug (10) from the inner end.
2. Place the spring (9) over the outer end of the piston (1).
3. Press the outer cable guide (6) onto the outer end of the piston.
4. While holding the actuator cable sheath ferrule (25) in its chamber (38) in the top of the case, and holding the cable end barrel (23) in its chamber (12), place the outer cable guide (6) on the cable, and use it to push the cable into the bore.
5. Press the plug (10) into the chamber (39) of the case.

Assembly can be quickly done by hand without tools, or with the aid of a clamp or pliers for pressing the outer cable guide onto the piston and pressing the plug into the case. The outer cable guide cannot walk off the piston because the cable force holds it on the piston. There is no force on the plug unless the outer cable guide stops against it in extreme piston extension. This is prevented by the pad contacting the rim. For disassembly, the plug can be expelled from the case by removing the wheel and extending the piston beyond its normal limit.

Alignment of the pad with the circumference line of the rim is done by twisting the piston in the outer cable guide. This is done after assembly with a wrench on the inner end of the piston (2), which has flats or hexagonal facets for this purpose. The outer cable guide is prevented from turning in the case chamber (39) by the non-circular cross section of the chamber and cable guide (FIGS. 6 and 7).

A case separation and lateral balance adjustment is provided by a horizontally elongated slot (48) in the (cantilever crossover brace. This compensates for differences in the separation of cantilever posts. It also balances the pad-to-rim clearance on both sides of the rim, compensating when the wheel is slightly off center. To perform the initial lateral case adjustment, both the right and left brake cases are held at the desired distance from the rim while the mounting bolt (32) is tightened in nut (57). This is a special nut with flats that index it to the adjustment slot (48) so that only one wrench is needed to tighten the bolt, leaving the other hand free to hold the cases. This quickly and permanently sets the cases at the proper separation and lateral balance, which does not need readjustment after pad changes or wheel removal.

Toe adjustment is not needed in these brakes, since they are highly rigid. No squealing was encountered in testing under all conditions—wet, dry, clean, dusty, and muddy—on a test stand and on road and mountain trails with a variety of pads, including types known to squeal. This simplifies installation and maintenance of the brakes, since toe adjustment is a time-consuming process on most bicycle brakes. If toe adjustability is desired, it can be provided by an adjustment screw through the case which contacts the cantilever post or the caliper crossover brace at a point laterally offset from the mounting point, to stop the case at the required angle.

Figure 19:
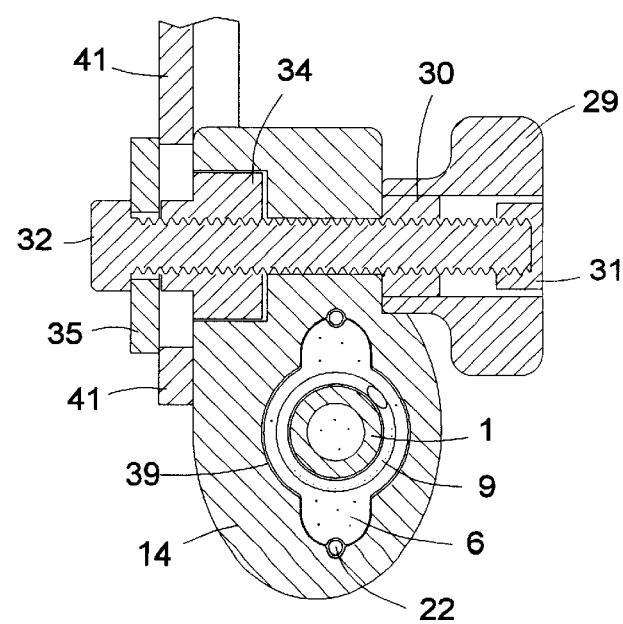
FIG. 19 is a sectional view of the left brake actuator along line 19—19 of FIG. 16.
Figure 20:
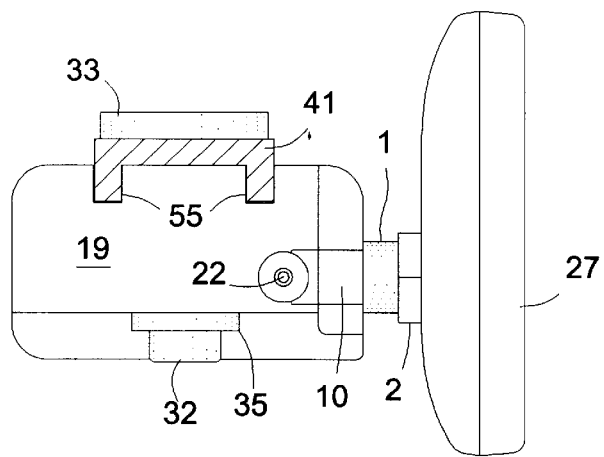
FIG. 20 is a top view of the right brake actuator along line 20—20 of FIG. 16.
Figure 21:
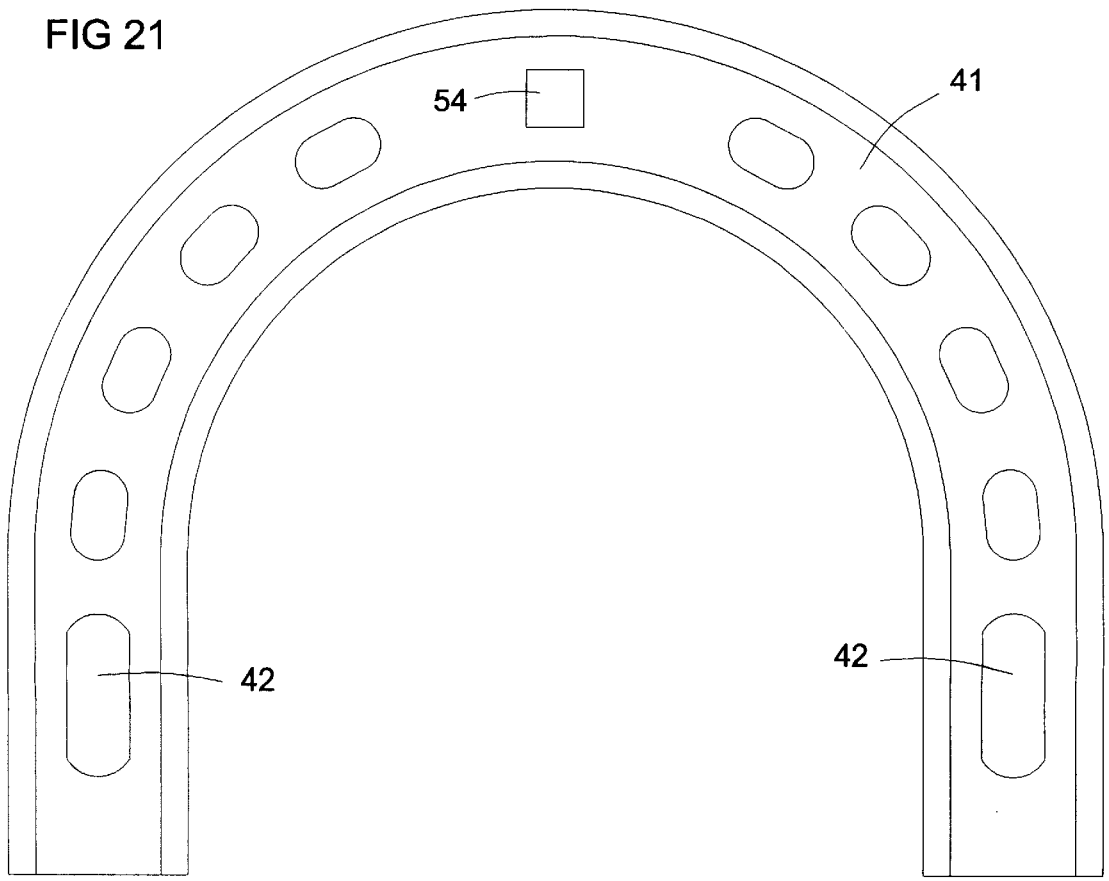
FIG. 21 is a front view of the caliper mount crossover brace.
Figure 22:
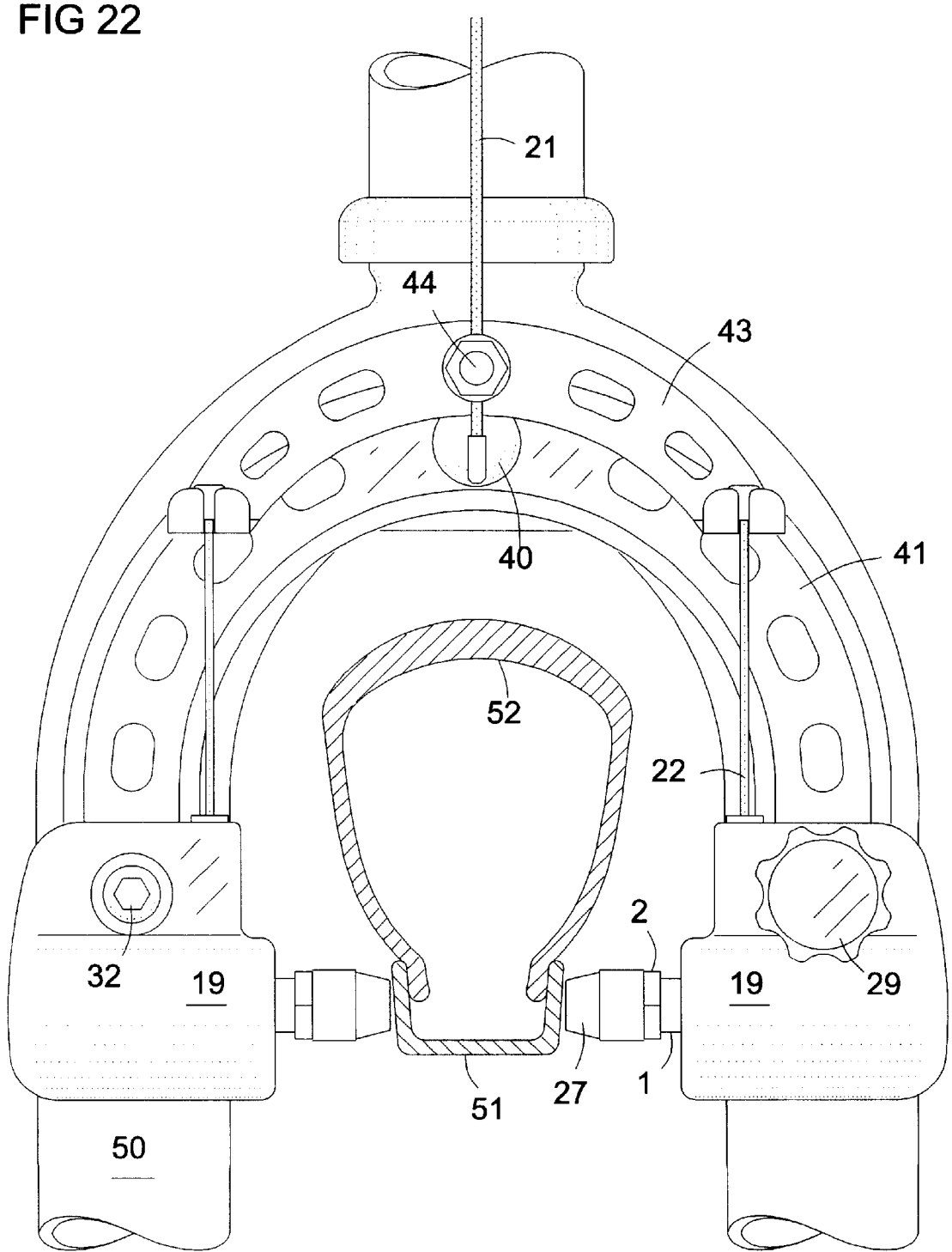
FIG. 22 is the brake of FIG. 13 shown with a wide standard cable bridge.
Figure 23:
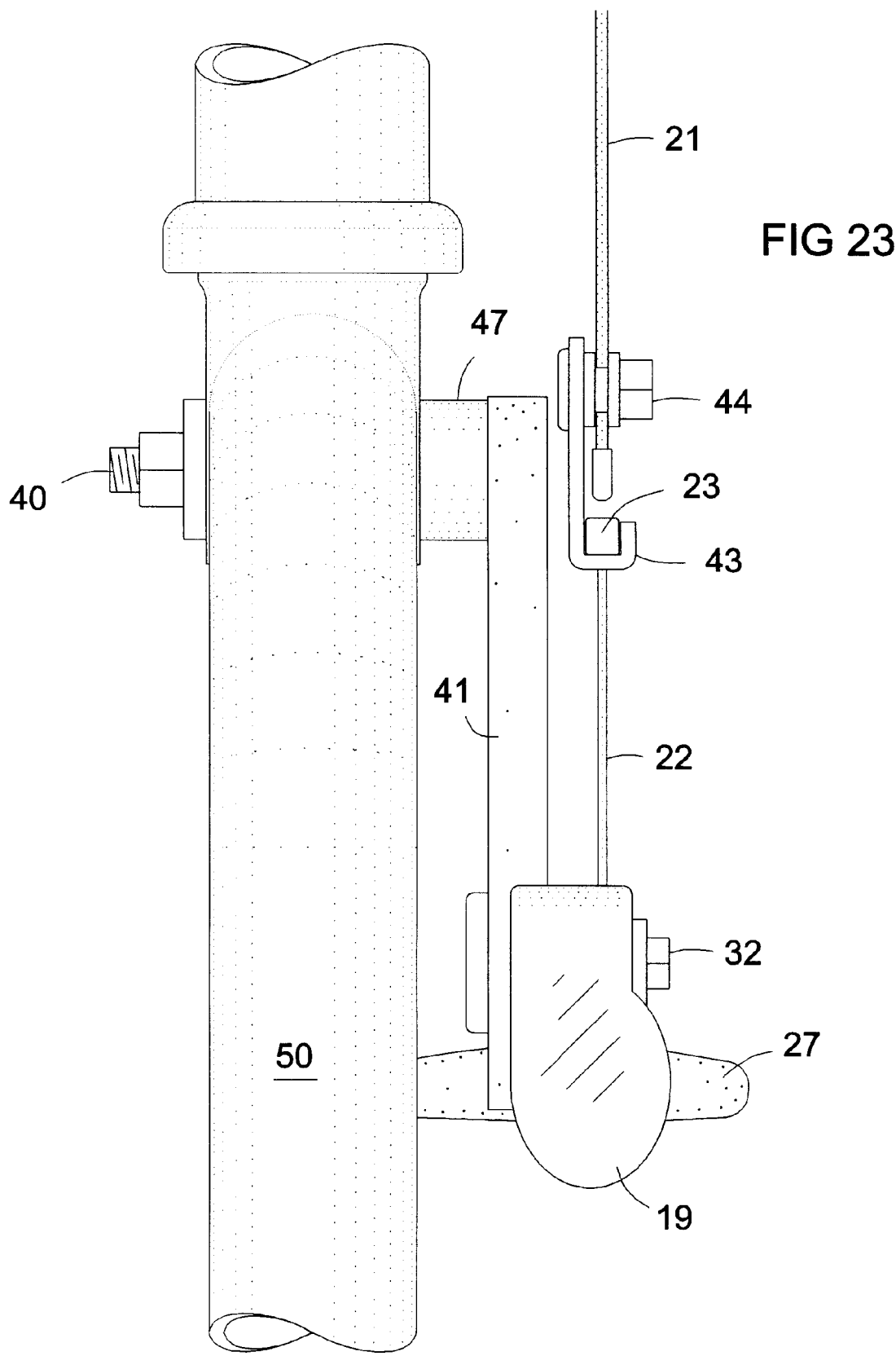
FIG. 23 is a side view of FIG. 22.
Figure 24:
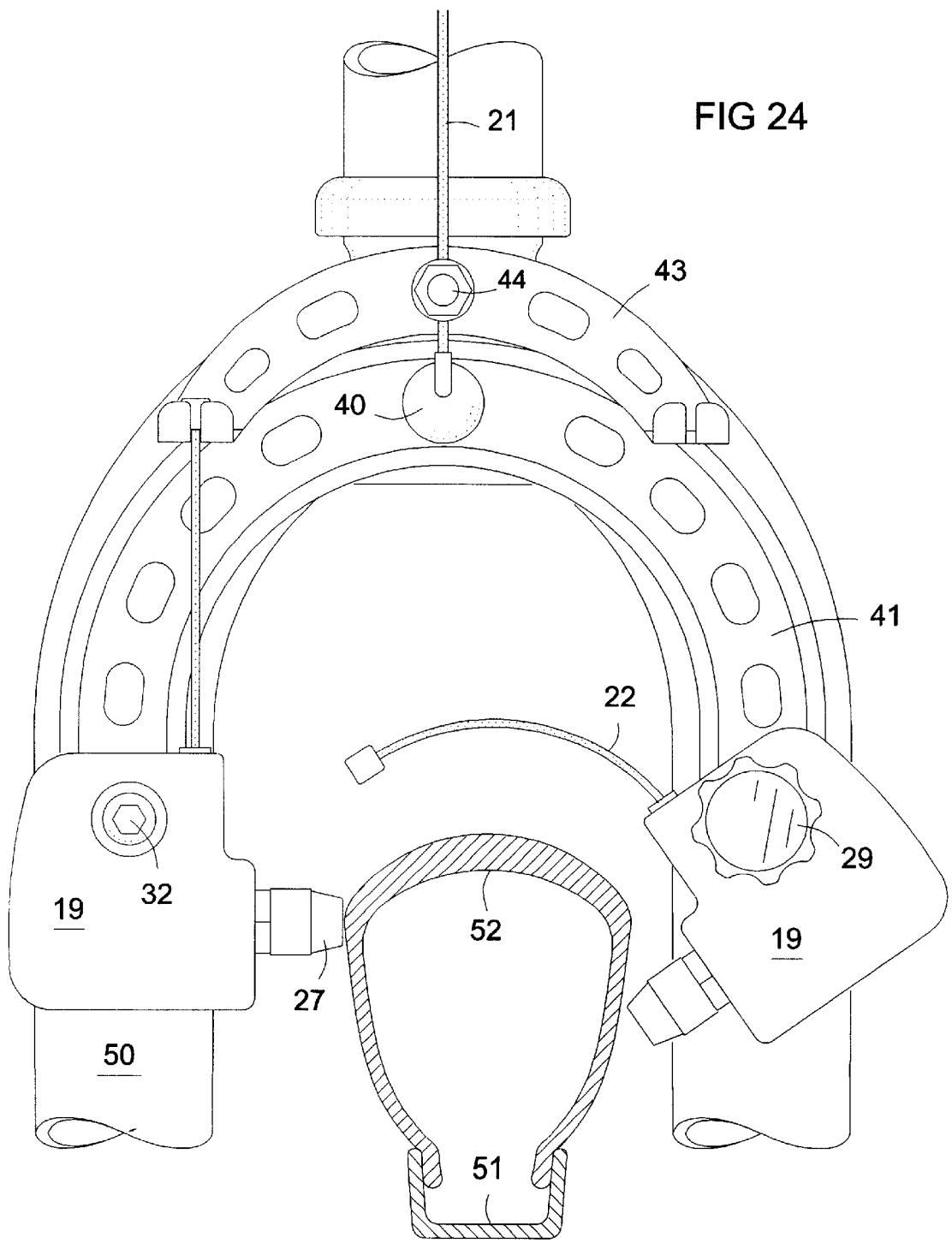
FIG. 24 is the brake of FIG. 22 showing the left actuator pivoted for wheel removal.

The caliper case (19) is mounted only to the crossover brace (41) at a vertically adjustable position via mounting slots (42), seen in FIG. 21. The caliper crossover brace is connected to the bicycle fork (50) by a bolt (40) through the conventional caliper brake mounting hole in the fork. The caliper crossover brace is indexed to the case via vertical tracks in the back side of the case. This prevents the case from pivoting in reaction to piston force. In order to pivot the cases for wheel removal, the left case is connected to the crossover brace by a bolt with two independent nuts as seen in FIG. 19. A vertical adjustment nut (34) fixes the mounting bolt (32) to the crossover brace at a desired height. After the initial height adjustment, this nut remains tight, saving the adjustment. The second nut (30) is inserted in a knob (29) which allows the user to loosen the nut without tools. When loosening the nut, it stops against a cap (31) which is pressed onto the end of the bolt. This prevents removal of the knob. In the loose position, the left brake actuator separates from the crossover brace enough to disengage the brace from the track in the case. This allows the left case to pivot outward as shown in FIGS. (16 and 24).

In both the caliper and cantilever versions of the brake, using either the cable-divider bridge or wide standard bridge, no vertical, lateral, or toe adjustment is needed after pad changes or wheel removal. To change pads, the old pads (27, 28) are unscrewed from the piston. No disassembly of the actuator is needed. The only readjustment needed after a pad change is the rim circumferential alignment, which is quickly done with a simple twist of the piston with a wrench on the flats of the inner end (2) of the piston.

Figure 25:
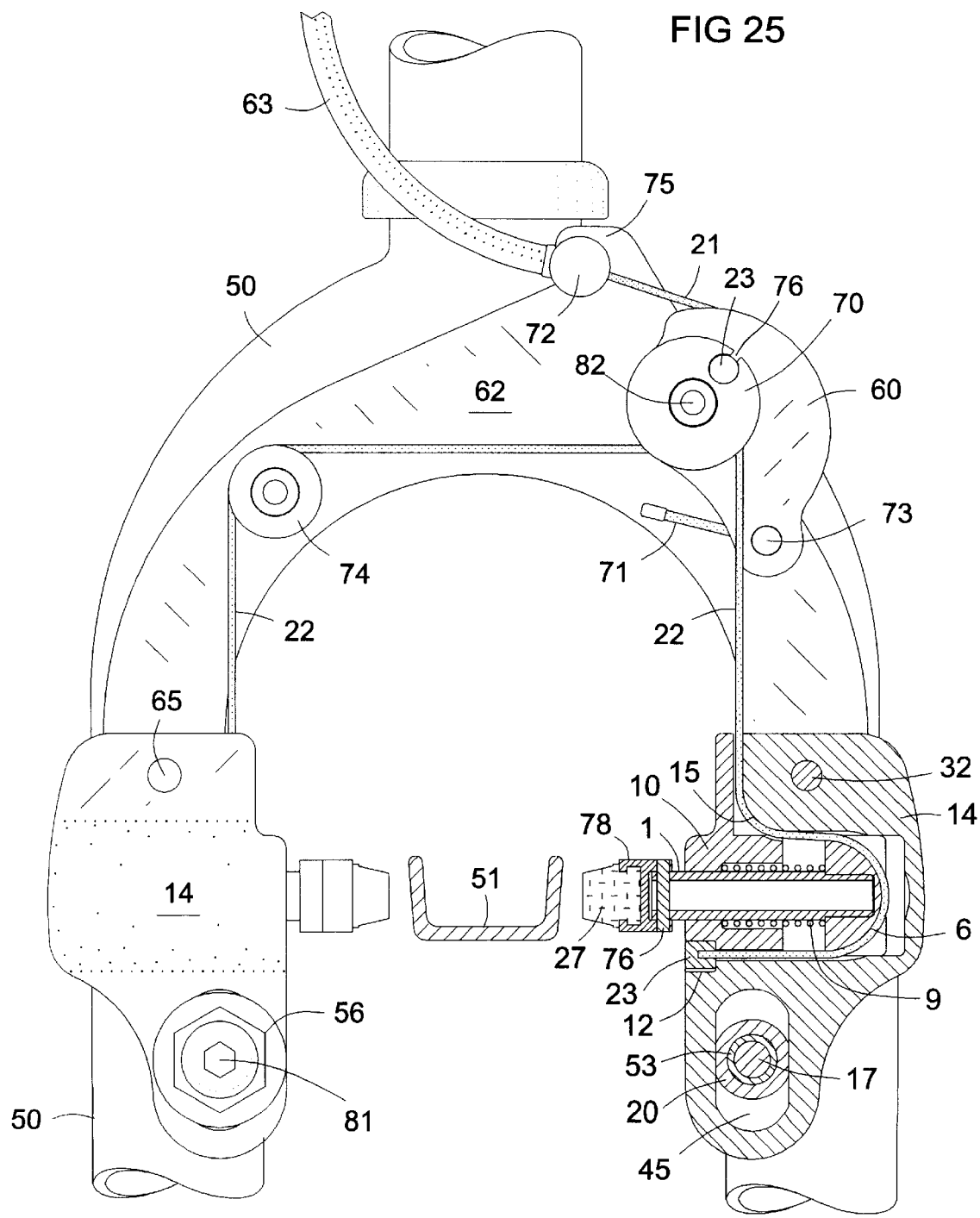
FIG. 25 is a front view of the invention with a cam for variable gain.

FIG. 25 shows an enhancement which provides complete gain control between the tension of the main brake cable and the resulting piston force. A cam (60) is attached to a dual pulley wheel (70), and both are mounted on the crossover brace (61, 62) by an axle (82). The cam is a plate with an eccentric lobe having a groove for the main cable (21). The main cable is directed tangent to the cam via a guide tube (63). The end of the guide tube is attached to a cable hanger post (72), which is releasably attached to the crossover brace (61, 62). It is held in a hook (75) in the crossover brace by cable tension. The main cable passes through the guide tube, through the hanger post, along the groove in the cam lobe, and the end of the cable is locked to the lower end of the cam. Thus, when the cable is pulled, the cam is rotated about its axle. The dual pulley wheel pulls both of the brake actuator cables with the variable gain of the cam. The cam provides low initial gain, increasing to high gain as the pad are extended and contact the rim. This provides both fast brake response and high power, eliminating the normal mechanical tradeoff between high gain and slow response. The cam also matches the brake to the lever. This is important because brake levers vary widely in gain, depending on the type of brake for which they were designed. The manufacturer may offer a choice of cams for different common levers.

Figure 26:
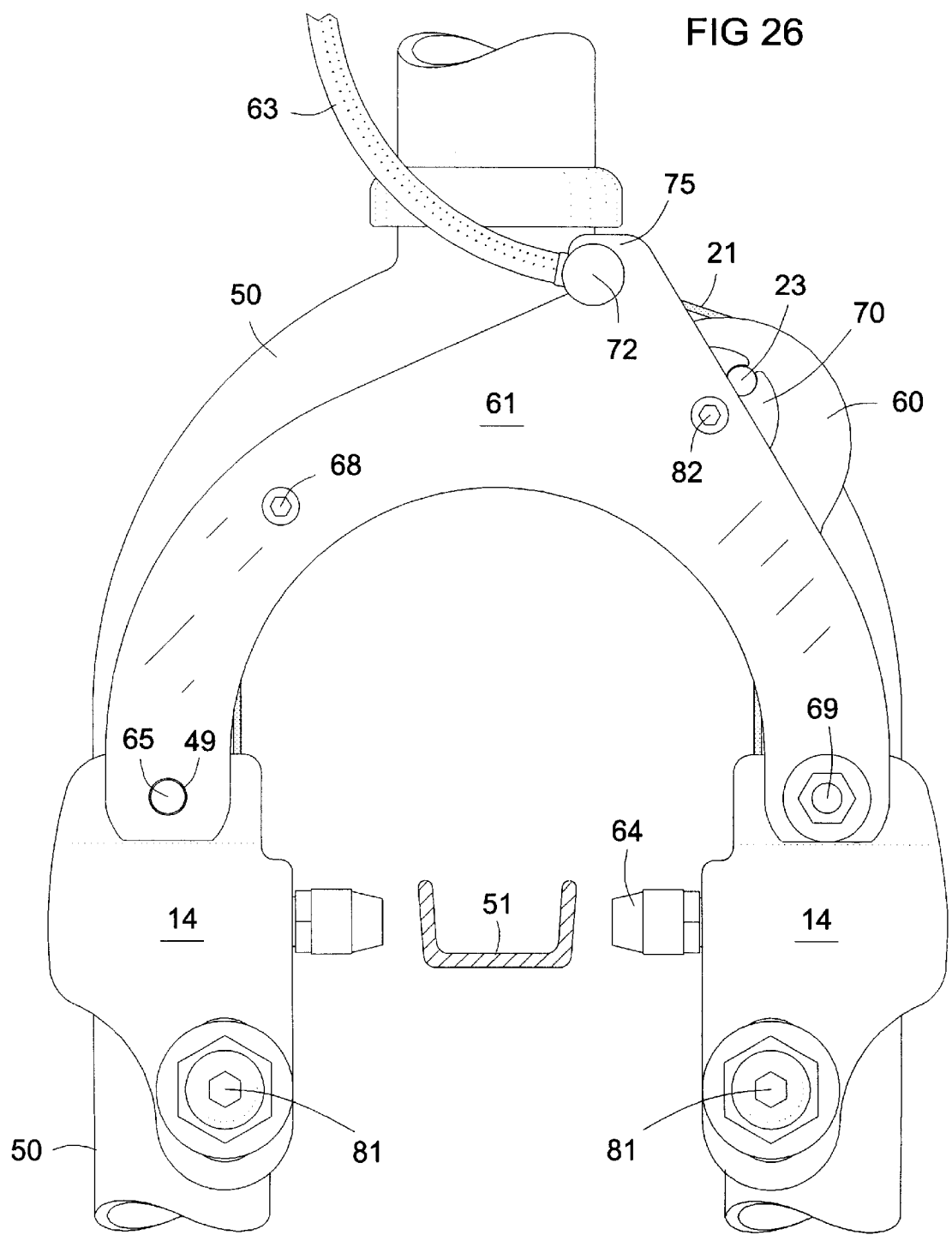
FIG. 26 is the view of FIG. 25 with a front plate on the crossover brace.

The brake actuator cables (22) are wrapped partially around the circumference of a respective one of two grooves in the dual pulley wheel (70) and are retained therein by setting the cable end barrel (23) in a holder slot (76) as shown. Each cable holder slot is preferably positioned to provide full pad extension within one wrap of the cable in each groove of the dual wheel. A guide pulley (74) guides the right actuator cable from the dual pulley to the right case (14). FIG. 26 shows a front plate (61) that covers and protects the gain control mechanism, and retains the front ends of the pulley axles (68, 82) and cable hanger post (72). The right end of the two crossover plates (61, 62) retain the brake cases against separation by a hole (49) which receives a pin (65) extending forward and backward from the right brake case. For tire and wheel removal with this embodiment, the cable hanger post (72) is slipped out of the hook (75) in the two crossover plates to release tension on the actuator cables. Then the front and back crossover plates are separated springably forward and backward respectively to slip the pins out of the holes. The cases (14) can then pivot outward, separating the pads enough to admit the tire between them. This operation is done without tools, and the brake system can then be reassembled by reversing the steps above, without need for readjustments. Initial adjustment for pad clearance is made by passing the main cable (21) through the cable lock (73), and tightening the lock at the desired pad clearance. This adjustment can be made again when the pads wear substantially.

Figure 27:
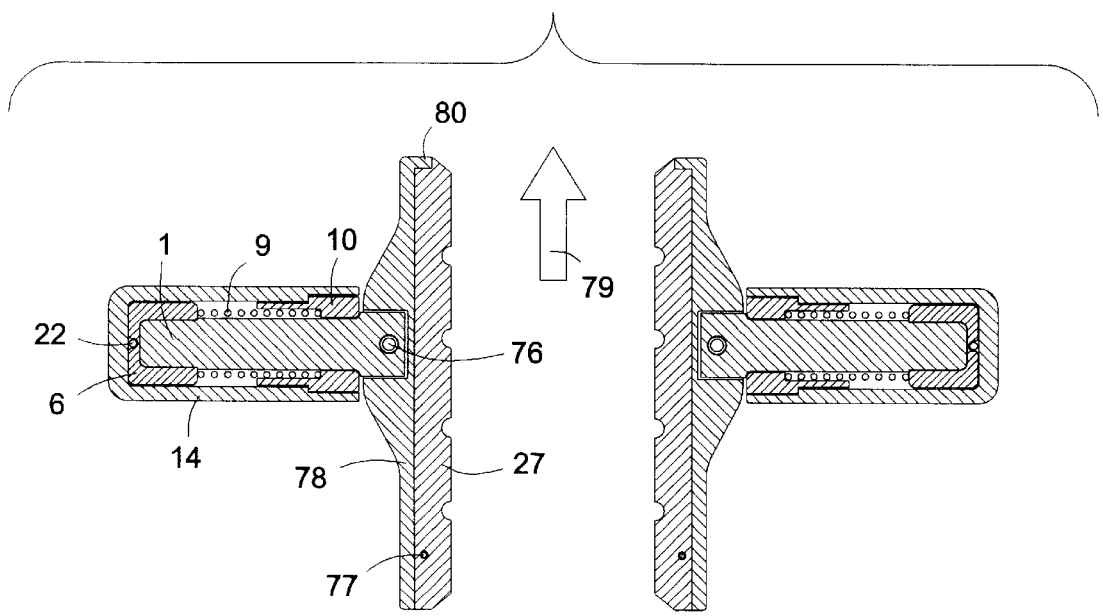
FIG. 27 is a top sectional view of the brake piston with pivotal pad mounts for automatic toe.
Figure 28:
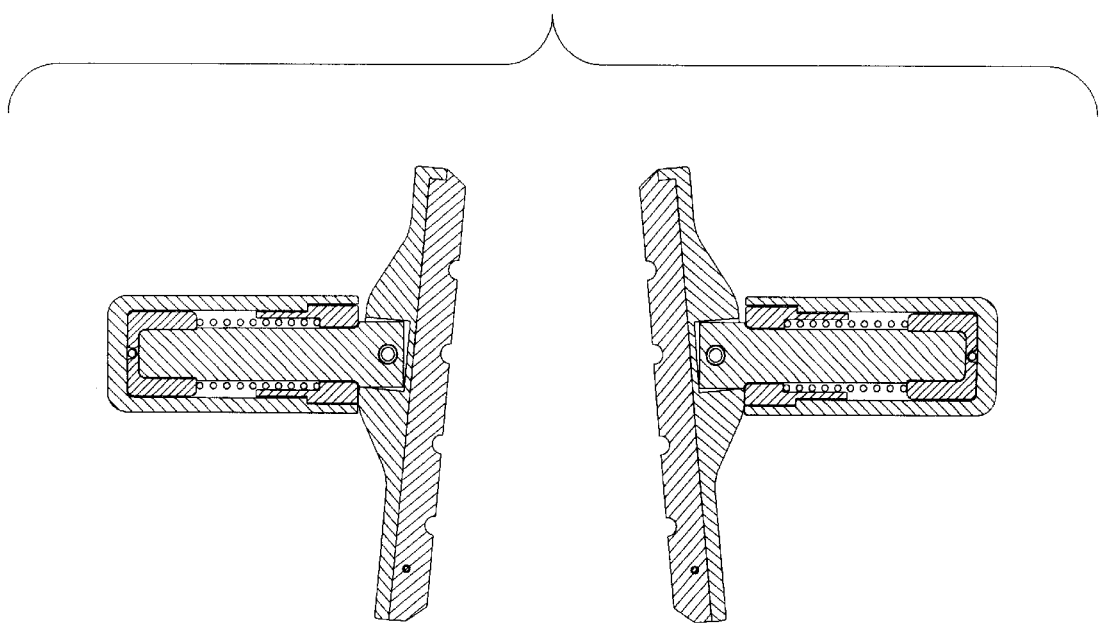
FIG. 28 is the view of FIG. 27 with the pads pivoted.

As shown in FIGS. 27 and 28, the brake pads preferably have floating toe, which automatically conforms to the rim. A brake pad holder (76) is pivotally attached to the inner end of the piston by a pivot pin (76) with a vertical axis. The pad holder this allows the pad to pivot about the vertical axis of the pin within a range limited by clearance between the holder and piston. This range is preferably limited to about 5 degrees. The pad is preferably removable from the holder for replacement. The holder can have a longitudinal C-channel, and the pad can have a matching cross section, so that the pad can slip into the channel where it is retained vertically by lips on the ends of the "C". It is retained longitudinally by a stop (80) on one end, and a pad holder pin (77) which passes through the pad holder and pad. This pin can be retained in place by friction and elasticity of the pad material, or it can have threads or other retention means. When this pin is removed, the pad can be slipped longitudinally out of the pad holder in the direction away from the stop for replacement.

Although the present invention has been described herein with respect to preferred embodiments, it will be understood that the foregoing description is intended to be illustrative, not restrictive. Modifications of the present invention will occur to those skilled in the art. All such modifications which fall within the scope of the appended claims are intended to be within the scope and spirit of the present invention.

Any cable guide element of this invention can be embodied as either a toric groove or a pulley wheel, and these should be considered equivalent. Toric grooves are generally preferred in this invention since pulley wheels are more expensive and larger. In the embodiments we have tested, the friction of a plastic toric groove is similar to that of a pulley wheel with a plain journal bearing.

I claim:

1. A cable operated piston brake actuator comprising:
   a brake case with a bore for a piston, the case having outer, inner, upper, and lower ends;
   a piston slidably mounted in the brake case, the piston having outer and inner ends;
   an actuator cable having first and second ends;
   a first cable guide on the upper inner end of the brake case for redirecting the cable from a generally vertical orientation above the case to a span above and parallel to the piston;
   a second cable guide on the outer end of the piston for redirecting the cable approximately 180 degrees between upper and lower spans approximately parallel to the piston;
   a cable end holder on the lower inner end of the brake case for holding the first end of the actuator cable;
   a spring in the brake case urging the piston to retract into the case; and
   the actuator cable is routed from above the brake case, around the first cable guide, thence around the second cable guide to the cable end holder;
   whereby a given tension force on the actuator cable above the case is transferred doubly to the piston, extending the piston from the inner end of the case.

2. A cable operated piston brake actuator according to claim 1, further comprising:
   a brake pad holder pivotally mounted on the inner end of the piston for automatic toe;
   and a brake pad retained in the brake pad holder.

3. A cable operated piston brake actuator according to claim 2, wherein:
   the brake pad holder is pivotally attached to the inner end of the piston by a pivot pin with a vertical axis;
   the pad holder has a longitudinal channel for receiving the brake pad;

the brake pad has a cross section that matches the holder channel for retention therein; and, a pad holder pin through the pad holder and pad for retaining the pad in the channel;

whereby the pad can be changed by removing the pad holder pin and sliding the pad out of the holder channel.

4. A cable operated piston brake system having first and second brake actuators according to claim 1, the inner ends of the two actuators facing each other, and further comprising:

a generally arch-shaped crossover brace having first and second ends;

the first end of the crossover brace attached to the upper end of the first actuator;

the second end of the crossover brace attached to the upper end of the second actuator;

first and second brake pads attached to the respective inner ends of the first and second pistons;

a gap between the two pads sufficient to admit a bicycle wheel rim;

whereby a bicycle wheel rim can be clamped between the two pads by extending both pads inward simultaneously.

5. A cable operated piston brake system according to claim 4, further comprising:

the brake cases pivotally mounted on respective conventional bicycle cantilever mounting posts;

a pin on the upper end of the first brake case;

a slip-hole on the first end of the crossover brace;

the first end of the crossover brace releasably attached to the upper end of the first brake case by insertion of the pin in the slip hole;

whereby the first end of the crossover brace can be released from the first brake case, allowing both brake cases to pivot apart to admit a bicycle wheel and tire past the brake pads between the brake cases.

6. A cable operated piston brake system according to claim 4, further comprising:

a vertically elongated attachment hole on the lower end of each brake case;

an adapter shaft that fits closely as a rotatable sleeve on a conventional bicycle cantilever brake mounting post, the adapter shaft having front and back ends, with a flange on the back end and nut threaded on the front end;

the adapter shaft passing through the attachment hole and tightened to the case at a selectable vertical position within the attachment hole;

whereby each case can be pivotally mounted on a respective conventional cantilever mounting post by slipping the adapter shaft over the post, and each case has a selectable vertical position relative to the post that is independent of the pivotal position of the case on the post.

7. A cable operated piston brake system according to claim 4, further comprising:

a main brake cable having an end;

a cam plate having a pivot axis, a lobe that is eccentric to the pivot axis, a groove on the lobe for accepting the main cable, and a cable end holder for retaining the end of the main cable;

the cam plate pivotally attached to the crossover brace;

a dual pulley attached to the cam plate, having first and second grooves that are generally concentric about the pivot axis of the cam plate for accepting the respective actuator cables;

a cable end holder on each groove of the dual pulley for retaining the second ends of the respective actuator cables;

the main cable laid in the groove of the cam lobe and retained therein by the cable end holder on the cam plate;

the two actuator cables laid in the respective grooves of the dual pulley, and retained therein by the respective cable end holders of the dual pulley, such that tension on the main cable pivots the cam and the dual pulley, thereby tensioning the two actuator cables in unison at a variable gain dependent on the shape and angular position of the cam lobe;

whereby the gain of the brake system relative to the tension of the main cable is controlled by the shape and angular position of the cam lobe.

8. The cable operated piston brake of claim 1, further comprising an inverted U-shaped crossover brace having first and second lower ends and a front and a back side, wherein the brake case is attached to the front side of the first lower end of the crossover brace by a case mounting bolt passing through the brake case above the piston, the brake case further including a lower boss with a vertically elongated slot for bolting the case to a cantilever brake mounting post at a given vertical position.

9. The cable operated piston brake of claim 8, wherein the brake case is pivotally mounted on a first cantilever post, the first lower end of the crossover brace has a horizontally elongated slot through which the case mounting bolt is attached, giving lateral adjustability of the case, further including a second brake case pivotally mounted on a second cantilever mounting post, the second brake case having a back side which is releasably engaged to the second lower end of the crossover brace.

10. The cable operated piston brake of claim 8, further including a cantilever post adapter shaft for mounting the brake case pivotally on a cantilever brake mounting post, and further including a second brake case having a second lower boss for bolting the second brake case to a second cantilever brake mounting post, the second brake case releasably engaged to the second lower end of the crossover brace.

11. The cable operated piston brake of claim 1, further comprising an inverted U-shaped crossover brace having first and second lower ends, a front and a back side, and having an apex with a hole for attaching the brace to a bicycle via a caliper mounting bolt, wherein the brake case is attached to the front side of the first lower end of the crossover brace by a case mounting bolt passing through the case above the piston, the case mounting bolt being tightened by a knob on the front of the case which can be loosened to allow the brake case to pivot.

12. The cable operated piston brake of claim 11, wherein the brake case is attached to the crossover brace via a vertically elongated slot in the first lower end of the crossover brace, said case mounting bolt having a faceted head on the back side of the crossover brace and a threaded shaft extending forward therefrom through the vertically elongated slot, the shaft having a threaded nut on the front side, of the crossover brace, and the nut having an indexing boss extending back into the vertically elongated slot, whereby the case mounting bolt can be tightened at a given vertical position on the crossover brace by rotating the faceted head with a wrench.

13. The cable operated piston brake of claim 1, further comprising:
- a main brake cable, enclosed in a cable sheath;
- a second cable sheath enclosing the actuator cable;
- a second actuator cable;
- a third cable sheath enclosing the second actuator cable;
- a cable divider frame having a top which retains the main cable sheath approaching from above, and a bottom which retains the second and third cable sheaths approaching from below;
- a coupler, vertically slidably mounted in the divider frame, having a center portion which retains the main cable approaching from above, and having two ends, each end retaining a respective one of the actuator cables approaching from below; and
- the brake case further comprises means for retaining the second actuator cable sheath approaching from above.

14. The cable operated piston brake of claim 1, wherein the outer end of the piston is substantially cylindrical, is pressed into a matching hole in the second cable guide, and the inner end of the piston has facets for engagement by an open-ended wrench, whereby the piston can be rotated relative to the second cable guide with a wrench.

* * * * *